(12) United States Patent
Baldemair et al.

(10) Patent No.: US 10,965,432 B2
(45) Date of Patent: Mar. 30, 2021

(54) METHODS AND DEVICES OPERATING WITH FINE TIMING REFERENCE SIGNALS TRANSMITTED OCCASIONALLY

(71) Applicant: TELEFONAKTIEBOLAGET LM ERICSSON (PUBL), Stockholm (SE)

(72) Inventors: Robert Baldemair, Solna (SE); Eleftherios Karipidis, Stockholm (SE); Stefan Parkvall, Bromma (SE); Henrik Sahlin, Mölnlycke (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/354,329

(22) Filed: Mar. 15, 2019

(65) Prior Publication Data

US 2019/0215135 A1 Jul. 11, 2019

Related U.S. Application Data

(63) Continuation of application No. 15/118,923, filed as application No. PCT/SE2016/050600 on Jun. 21, 2016.

(60) Provisional application No. 62/302,769, filed on Mar. 2, 2016.

(51) Int. Cl.
*H04L 5/00* (2006.01)
*H04W 56/00* (2009.01)
*H04L 27/26* (2006.01)

(52) U.S. Cl.
CPC .......... *H04L 5/0085* (2013.01); *H04L 5/0025* (2013.01); *H04L 5/0048* (2013.01); *H04L 5/0051* (2013.01); *H04L 27/2613* (2013.01); *H04L 27/2692* (2013.01); *H04W 56/0015* (2013.01); *H04L 5/0091* (2013.01)

(58) Field of Classification Search
None
See application file for complete search history.

(56) References Cited

U.S. PATENT DOCUMENTS

| | | | |
|---|---|---|---|
| 8,265,200 B2 * | 9/2012 | Rajagopal | H04L 5/0048 375/260 |
| 8,948,076 B2 | 2/2015 | Kim et al. | |
| 9,686,772 B2 | 6/2017 | Chen et al. | |
| 2002/0122465 A1 | 9/2002 | Agee et al. | |
| 2005/0078598 A1 | 4/2005 | Batra et al. | |

(Continued)

FOREIGN PATENT DOCUMENTS

| CN | 103974407 A | 8/2014 |
|---|---|---|
| EP | 2418894 A1 | 2/2012 |

(Continued)

OTHER PUBLICATIONS

Final Office Action, dated Jul. 18, 2018, from corresponding/related U.S. Appl. No. 15/118,923.

(Continued)

*Primary Examiner* — Bunjob Jaroenchonwanit
(74) *Attorney, Agent, or Firm* — Patent Portfolio Builders PLLC

(57) ABSTRACT

Methods and devices enable a fine synchronization related to a data transmission on a physical channel. A fine timing reference signal is occasionally transmitted to the data transmission recipient using one of time-frequency resources in a recipient-specific pattern.

11 Claims, 10 Drawing Sheets

(56) References Cited

U.S. PATENT DOCUMENTS

| | | |
|---|---|---|
| 2006/0045053 A1 | 3/2006 | Erlich et al. |
| 2007/0071037 A1 | 3/2007 | Abraham et al. |
| 2009/0003308 A1 | 1/2009 | Baxley et al. |
| 2009/0047913 A1 | 2/2009 | Kuru |
| 2010/0124292 A1 | 5/2010 | Rajagopal |
| 2012/0039282 A1 | 2/2012 | Kim et al. |
| 2012/0069834 A1 | 3/2012 | Ancora et al. |
| 2012/0122495 A1 | 5/2012 | Weng et al. |
| 2012/0243433 A1 | 9/2012 | Kneckt et al. |
| 2013/0022096 A1 | 1/2013 | Kazmi et al. |
| 2013/0182594 A1 | 7/2013 | Kim et al. |
| 2014/0036800 A1* | 2/2014 | Frenne ............ H04L 5/0091 370/329 |
| 2014/0198763 A1* | 7/2014 | Sorrentino ........ H04B 7/024 370/330 |
| 2015/0043475 A1* | 2/2015 | Kim ............ H04W 4/70 370/329 |
| 2015/0043664 A1 | 2/2015 | Koga et al. |
| 2015/0341153 A1* | 11/2015 | Jongren ........ H04W 56/0035 370/329 |
| 2015/0372851 A1* | 12/2015 | Kakishima ........ H04W 56/00 370/329 |
| 2016/0021632 A1* | 1/2016 | Sun ............ H04W 56/00 370/350 |
| 2016/0174238 A1 | 6/2016 | Chen et al. |
| 2016/0248561 A1* | 8/2016 | Davydov ........ H04B 7/0413 |
| 2016/0285605 A1* | 9/2016 | Andersson ........ H04L 25/0226 |
| 2016/0323134 A1 | 11/2016 | Berggren et al. |
| 2017/0126381 A1* | 5/2017 | Park ............ H04L 5/0048 |
| 2017/0222785 A1 | 8/2017 | Li et al. |
| 2018/0287681 A1 | 10/2018 | Chen et al. |
| 2019/0116594 A1 | 4/2019 | Kwak et al. |
| 2020/0053633 A1* | 2/2020 | Ng ............ H04W 48/12 |
| 2020/0235798 A1* | 7/2020 | Chen ............ H04W 72/04 |

FOREIGN PATENT DOCUMENTS

| | | |
|---|---|---|
| JP | 2015525043 A | 8/2015 |
| KR | 1020110088583 A | 8/2011 |
| KR | 10-2012-0015797 A | 2/2012 |
| KR | 10-2014-0116471 A | 10/2014 |
| WO | 2012012008 A2 | 2/2012 |
| WO | 2013106637 A1 | 7/2013 |
| WO | 2014022209 A1 | 2/2014 |

OTHER PUBLICATIONS

International Search Report and Written Opinion, dated Nov. 25, 2016, from corresponding/related International Application No. PCT/SE2016/050600.

Office Action, dated Jan. 24, 2018, from corresponding/related U.S. Appl. No. 15/118,923.

Office Action in corresponding/related U.S. Appl. No. 15/118,923 dated Jul. 11, 2019.

Office Action in corresponding/related Korean Application No. 10-2018-7028298 dated Nov. 28, 2019.

Office Action in corresponding/related European Application No. 16 742 040.5 dated Dec. 13, 2019.

Office Action in corresponding/related Japanese Application No. 2018-545657 dated Jul. 30, 2019.

SAMSUNG; "Summary of offline discussion on LAA tx burst detection and fine synchronization"; R1-156203, 3GPP TSG RAN WG1 #82bix; Oct. 5-9, 2015; 5 pages.

Office Action in related/corresponding Chinese Application No. 201680085230.X dated Jul. 1, 2020.

Notice of Allowance in corresponding/related Korean Application No. 10-2018-7028298 dated Nov. 24, 2020, with English translation.

Office Action in related/corresponding Chinese Application No. 201680085230.X dated Dec. 15, 2020, with English translation.

Examination Report in corresponding/related Australian Application No. 2020202973 dated Jan. 18, 2021.

* cited by examiner

METHODS AND DEVICES OPERATING WITH FINE TIMING REFERENCE SIGNALS TRANSMITTED OCCASIONALLY

TECHNICAL FIELD

Embodiments of the subject matter disclosed herein generally relate to fine time synchronization in a wireless communication network, and, more particularly, to occasionally transmitting a fine timing reference signal (FTRS) in a manner specific to a targeted recipient.

BACKGROUND

A prerequisite for a terminal to communicate with a network is to acquire time synchronization. Wideband reference signals are currently used for efficient and accurate time synchronization. In LTE (i.e., Long-Term Evolution, which is a mobile communication standard), wideband Cell-specific Reference Signals (CRS) are transmitted over all the system's bandwidth (BW), multiple times in every subframe. The CRS being transmitted over all the system's BW makes it difficult to introduce new channels and signals in the future, and transmitting CRS continuously leads to high network energy consumption.

It is desirable to improve the methods related to timing reference signal to enhance synchronization as needed while allowing more BW flexibility and using less energy than the conventional methods currently achieve.

SUMMARY

In various embodiments described in this document, a fine timing reference signal (FTRS) is transmitted when necessary (e.g., related to a data transmission on a physical channel), in a manner related to a targeted recipient. The FTRS may be transmitted in a time-frequency resource of an FTRS pattern that is quasi-co-located (in time, in frequency or in both time and frequency) with the data transmission for which the accurate timing is necessary. FTRS transmission may be triggered by the targeted recipient (i.e., FTRS are transmitted on demand), by a situation inferred from the targeted recipient's signal quality report, by the transmitting node depending on a type of transmission on the corresponding physical channel (e.g. transmission with higher-order modulation or MIMO) or by an analysis of the targeted recipient's uplink transmissions. The FTRS pattern is configurable and preferably spans less than the entire available bandwidth.

According to an embodiment there is a method implemented in a wireless device connected to a communication network. The method includes listening according to an FTRS pattern that includes a sequence of time-frequency resources, until detecting an FTRS related to a data transmission on a physical channel. The method further includes receiving the data transmission on the physical channel.

According to another embodiment there is a wireless device connectable to a communication network including a transceiver and at least one processor. The transceiver is configured to listen for an FTRS related to a data transmission on a physical channel, and to receive the data transmission. The at least one processor is configured to control the transceiver to listen for the FTRS according to an FTRS pattern that includes a group of time-frequency resources, until the FTRS is detected, and to decode the data transmission.

According to yet another embodiment, there is a wireless device in a communication network having a listening module and a data receiving module. The listening module listens according to an FTRS pattern that includes a group of time-frequency resources, until detecting an FTRS related to a data transmission on a physical channel. The data receiving module receives the data transmission.

According to another embodiment, there is a method implemented in a network device of a communication network. The method includes detecting a trigger for transmitting an FTRS related to a data transmission on a physical channel, for a wireless device, and transmitting the FTRS according to an FTRS pattern associated with the wireless device and including a sequence of time-frequency resources.

According to another embodiment, there is a network device of a communication network having at least one processor and a transceiver. The processor is configured to detect a trigger for transmitting an FTRS related to a data transmission on a physical channel. The transceiver is connected to and controlled by the at least one processor to transmit the FTRS according to an FTRS pattern that includes a group of time-frequency resources.

According to yet another embodiment, a network device in a communication network includes a detecting module and a transmission module. The detecting module detects a trigger for transmitting an FTRS related to a data transmission to a wireless device, on a physical channel. The transmission module transmits the FTRS according to an FTRS pattern associated with the wireless device and including a group of time-frequency resources.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
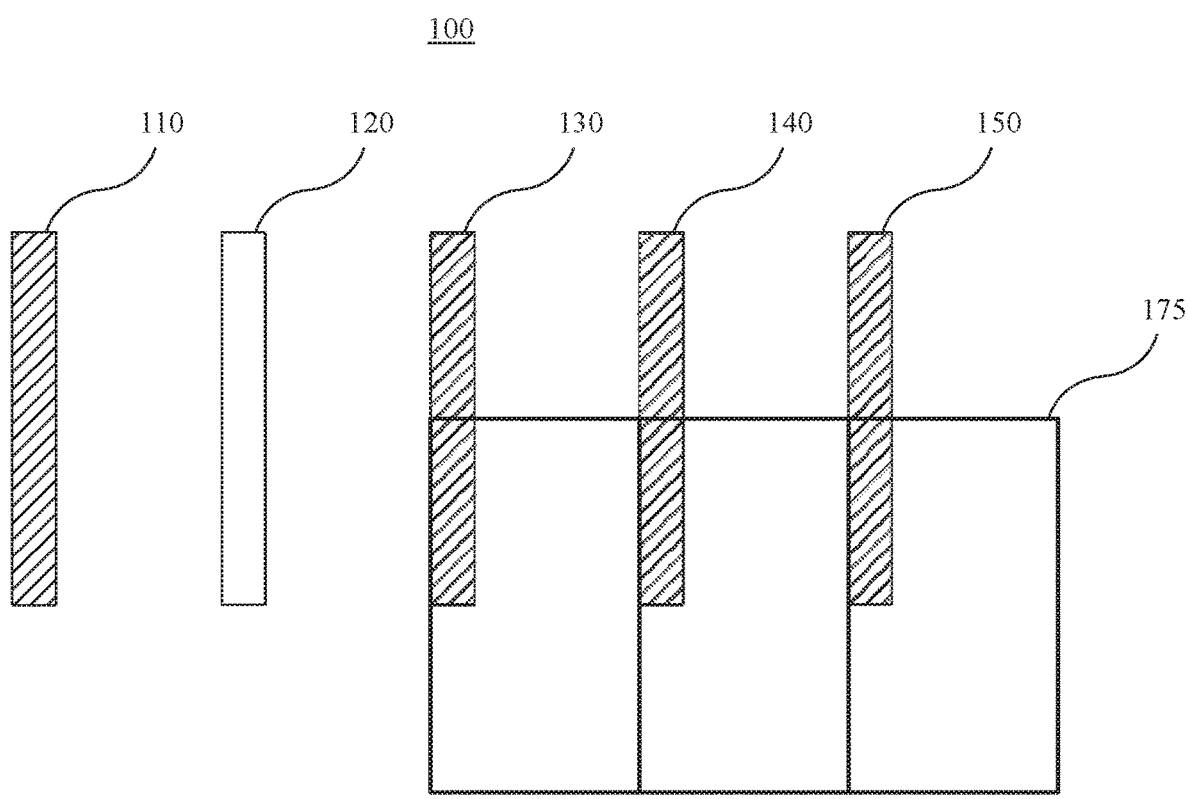
FIGS. 1 and 2 are graphical illustrations of FTRS-related resource-usage situations according to exemplary embodiments.

The following description of the embodiments refers to the accompanying drawings. The same reference numbers in different drawings identify the same or similar elements. The following detailed description does not limit the invention. Instead, the scope of the invention is defined by the appended claims. The following embodiments refer to methods, wireless devices and nodes in a communication network.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The following abbreviations are used in this document:
CDM Code Division Multiplex
CRS Cell-specific Reference Signal
FTRS Fine Timing Reference Signal
HOM Higher Order Modulation
LTE Long-Term Evolution
MIMO Multiple Input Multiple Output
RRC Radio Resource Control 3GPP, the standardization organization behind LTE, has begun work on 5G, a new generation of communication standards. 5G will consist of LTE evolution together with a new radio-access technology, known as "NR". LTE aspect in related to backwards-compatible enhancements in the existing spectrum up to ~6 GHz, while NR focuses on existing and new spectrum. Although large amounts of contiguous spectrum are less cumbersome to find at higher frequencies, lower frequencies are important for wide-area coverage. NX will, therefore, be able to operate from below 1 GHz up to close to 100 GHz.

In 5G, the time-synchronization procedure is planned to have two phases. A wireless device achieves coarse time synchronization in the first phase and determines the start of the downlink transmission frame. This coarse synchronization enables the device to obtain system and control information during initial access and mobility procedures. The wireless device then acquires fine time synchronization in a second phase. This fine time synchronization is essential when there is scheduled data transmission—especially one applying modulation with high spectral efficiency—for the wireless device, in order to enable accurate channel estimation and subsequent data detection. Data detection, especially in the cases of high-order modulation and spatial multiplexing (e.g., MIMO), has higher requirements on channel estimation quality. Different reference signals and/or synchronization signals are used for the two synchronization phases. The various embodiments of the current inventive concept are pertinent to the fine time synchronization procedure and the corresponding FTRS.

In NX, ultra-lean transmission is envisioned aiming to minimize the always-on transmissions such as the CRS. In this new paradigm, the wireless device makes no assumption on a subframe's content (i.e., each particular signal is configurable and may thus be absent in a particular frame), unless a specific signal is scheduled in that subframe or the device has been instructed to expect supporting signals. This manner of operation has several benefits, such as (but not limited to) energy efficiency and interference minimization.

Another characteristic present in some embodiments is that transmissions are well-confined in time and in frequency, so that dependency across subframes is avoided, and the spectrum is not cluttered with signals outside the scheduled data transmission. This means reference signals necessary for channel estimation may be transmitted in the same subframe and over the same bandwidth as the data transmission.

In this approach, multi-antenna schemes become more transparent to the wireless device, and the subframe structure may be used for new services. That is, transmission may be allocated the full available system bandwidth. If new services are added, allocation of new resources (e.g., time and frequency) has to consider that some subcarriers all over the system's bandwidth are partly used (to make sure that the new service-related signals do not overlap already allocated resources). When reference signal transmissions are confined to a time-frequency box the situation becomes much simpler. The embodiments described in this section achieve a design trade-off to maintain the fundamental ability of acquiring fine time synchronization, while maintaining a lean and future-proof carrier. Although the embodiments set forth in this document can be used for fine time synchronization in 5G, this type of paradigm is not the only field where the present embodiments are applicable and useful.

A wireless device can be configured with an FTRS pattern for listening for the FTRS. Fine synchronization achieved using the FTRS enables superior timing estimation during demodulation of data received in a corresponding physical channel. In this document, the term "UE" (i.e., user equipment) may be used as a shorthand notation for wireless device, but this notation is not intended to be limiting.

An example FTRS pattern includes a sequence of time-frequency resources, i.e. time and bandwidth limited resources that may be used for transmitting the FTRS. In a multi-carrier system, the resources correspond to the subcarriers allocated to the FTRS pattern. It is advantageous to construct multiple orthogonal FTRS. Orthogonality may be obtained by mapping FTRS to different symbols or to different subcarriers (e.g. a subcarrier comb or non-overlapping bandwidth), and/or using (partly) overlapping time-frequency resources, while ensuring that orthogonality is achieved over the overlapping resources via the FTRS content. Ensuring orthogonality may include applying orthogonal cover codes or classical CDM, such as cyclically shifted Zadoff-Chu sequences. Configuration of FTRS may be done using higher-layer signaling such as Radio Resource Control (RRC) signaling.

The configured resources may include a time pattern (e.g. periodic) and the FTRS may be transmitted according to this pattern. Another possibility is that the configuration just specifies the resources, where FTRS may be transmitted. In this case, determination of whether to transmit FTRS may be more dynamic, as discussed later (see section "Triggering of FTRS Transmission"). If FTRS resources are specified but not necessarily used, the UE may dynamically determine if FTRS have been sent or not (see section "Dynamic Determination whether FTRS are Present").

Figure 2:
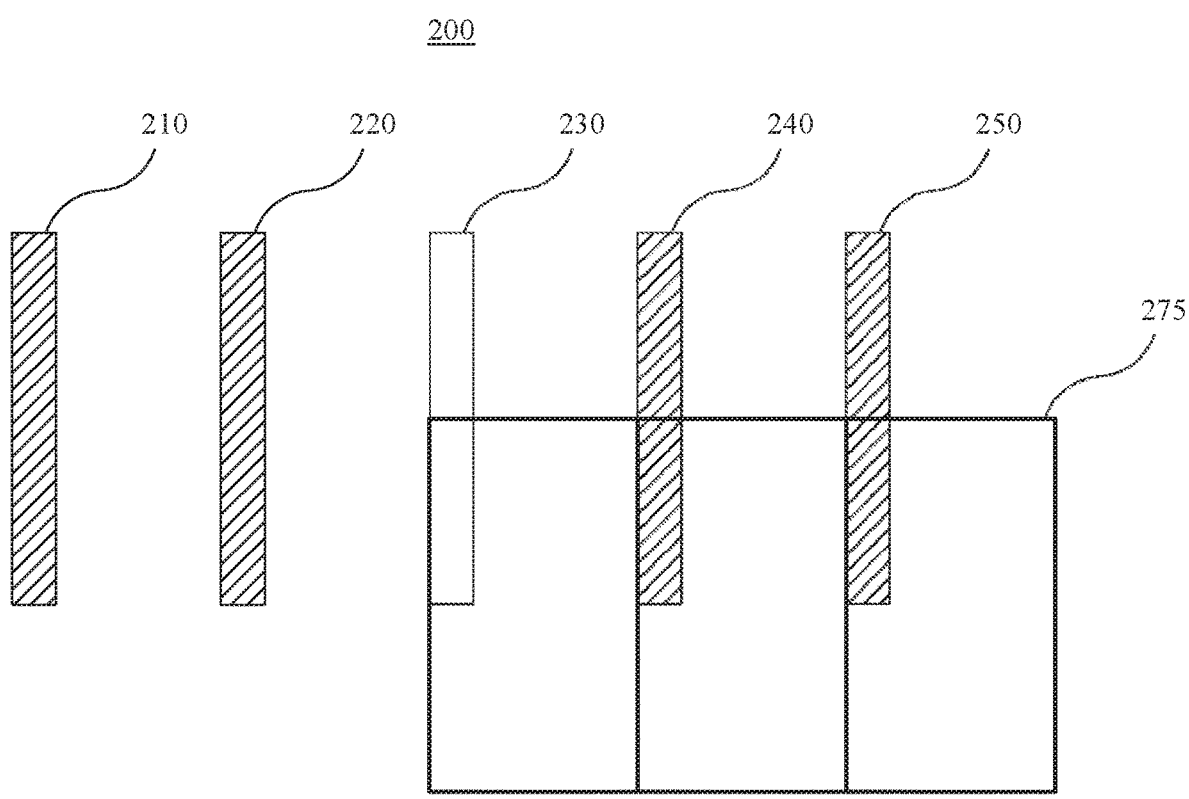

FIGS. 1 and 2 are graphical illustrations (time vertically versus frequency horizontally) of FTRS-related resource-usage situations 100 and 200. A UE (not shown in these figures) is configured to potentially receive FTRS in time and frequency blocks (i.e., resources) 110, 120, 130, 140 and 150, in FIG. 1, and 210, 220, 230, 240 and 250, in FIG. 2, respectively. A sequence of time-frequency resources (i.e., 110-150 or 210-250) forms an FTRS pattern, which is limited in time and bandwidth. In a FTRS pattern, one time-frequency resource may consist of a plurality of resource elements which are contiguous in the time-frequency plane. However the time-frequency resources may also be discrete in frequency. The time-frequency resource in this pattern actually used to transmit FTRS may precede or (partially) overlap the frequency-time blocks (i.e., 175 and 275, respectively) scheduled for the data transmission on the physical channel. The scheduled frequency-time blocks may be bandwidth and potentially also time (if data volume is known) allocated for a data transmission. Accurate timing achieved based on FTRS is used for channel estimation and decoding data received during the data transmission.

Although plural time-frequency resources may be used for transmitting the FTRS, the FTRS is actually transmitted using only one or few of these resources. In one embodiment, the FTRS pattern may be periodic and not limited to a time interval, although the FTRS are transmitted occasionally, in association with definite data transmission(s). In FIG. 1, time-frequency resource 120 preceding the frequency-time block 175 scheduled for the data transmission is used for transmitting the FTRS, while other resources of the FTRS pattern (i.e., 110, 130, 140 and 150) are not used for transmitting the FTRS. In FIG. 2, frequency-time resource 230 overlapping the frequency-time block 275 scheduled for the data transmission is used for transmitting the FRTS, while other resources of the FTRS pattern (i.e., 210, 220, 240 and 250) are not used for transmitting the FTRS. In the latter case, the data transmission is punctured by the FTRS transmission. Frequency-time resources of the FTRS pattern overlapping with the frequency-time block scheduled for data transmission, but not used for the FTRS transmission (e.g., 130, 140, 150, 240 and 250) are instead used for the data transmission.

Data transmission may either be punctured or rate mapped around FTRS. In puncturing, during channel coding, the resource loss due to FTRS resources is not considered, but the coded bits overlapping the used FTRS resources are not transmitted. If FTRS is considered during rate matching, the code rate is slightly increased, i.e. less coded bits are generated which fit the data resources minus FTRS resources.

Beamforming 5G systems will often be deployed using many steerable antenna elements (e.g., using an array of independently controllable antenna elements) at least on the base station. To reduce interference and/or improve coverage data sent to a UE by such systems, transmissions will therefore often be user-specifically beamformed. For control signaling (such as handover signaling), fixed and often wider beams are used to increase robustness of the signaling. These different beamforming patterns can be created by selecting different precoder weights. Transmitting FTRS uses beamforming, sometimes purposefully matching the coverage of the FTRS transmission beam with the beam for the related data transmission on the physical channel. However, the beamforming weights of the FTRS transmission beam don't have to be the same as the weights used in the related data transmission on the physical channel. Using different weights—e.g., weights creating wider beams for transmitting the FTRS—has the advantage that the FTRS can be used by multiple UEs. However, a wide beam pattern may not always be favored, e.g., it may fail to provide sufficient coverage for the FTRS to reach the targeted UE, or due to rare propagation conditions the timing obtained from FTRS transmitted with a wide beam may not match the data transmission because different propagation paths are experienced for different beams. Thus, the FTRS beam may be formed using similar or the same weights as for the corresponding data transmission on the physical channel. Especially, if the beam for the corresponding data transmission on the physical channel is narrow, the FTRS beam may also only cover a single user.

Triggering an FTRS Transmission

Since, in some embodiments, FTRS are not always transmitted on the configured resources, the network needs to dynamically decide when to transmit FTRS. An example would be HOM or MIMO transmissions, which typically require accurate timing; the network may trigger an FTRS transmission when the corresponding data transmission on the physical channel is a HOM or a MIMO transmission.

Even if a transmission needing accurate timing is scheduled, the network may refrain from transmitting an FTRS if the UE has sufficiently accurate timing. The UE may be determined to have sufficiently accurate timing if the FTRS has been recently transmitted (as in FIG. 1 when FTRS was transmitted shortly before the data transmission is scheduled), if the block error rate (BLER) is in the expected range, or if the timing of UL transmissions from the UE arrive at the network accurately with respect to time. The UE may also request transmissions of FTRS or report reception quality. Reception quality may be explicitly related to timing, or at least enable the network to infer whether timing accuracy is adequate.

Dynamic Determination Whether FTRS are Present

If not all configured FTRS resources contain FTRS transmissions (i.e., if the design of the system allows using only some of the possible FTRS resources, depending on need), the UE may be configured to determine if FTRS is present or not. If FTRS is very wideband and/or long, it may provide sufficient processing gain and the UE could detect FTRS presence blindly.

If the UE is not able to detect the presence of FTRS, according to an embodiment, the UE may receive an indication that FTRS are present or forthcoming. Such an indication may be sent in an extra bit (or bit field if not only transmission yes/no is indicated, but a few more parameters can be dynamically selected) in the control channel scheduling the corresponding data transmission on a physical channel (which requires the accurate timing). Some embodiments may operate according to an implicit (default) rule. For example, if the control channel schedules a data transmission requiring accurate timing (e.g. HOM, MIMO), then the overlapping/next coming/closest configured time-frequency resource contains an FTRS.

In another embodiment, an extra control channel message may be used to schedule FTRS. A scheduling command may be valid for the next configured FTRS resource, or for an FTRS-configured resource in the near future, or for a few configured FTRS resources. Since an extra control channel typically requires a few bits such as user/group ID, the relative additional overhead could be acceptable to allow for somewhat more dynamic options. An interesting option is to schedule this control channel (and thus the FTRS) not to a single user but to a group of users; the control channel would in this case use a group ID.

UE Behavior

According to an embodiment, a UE configured with FTRS is able to determine if FTRS are present in one of the FTRS pattern's frequency-time resources (as already discussed is section "Dynamic Determination whether FTRS are Present"). If the UE determines no FTRS is present, it assumes the FTRS pattern's frequency-time resources are not used for FTRS. For example, if the UE has other physical channels/signals overlapping with the FTRS pattern's frequency-time resources, it assumes the FTRS pattern's frequency-time resources are used for this other physical channel/signal (e.g., as 130-150 in FIG. 1).

If the UE determines that FTRS is present, the UE assumes the configured resources are not used for another physical channel/signal to be received by the UE. For example, if the UE receives a data transmission on the physical channel partly overlapping with the FTRS pattern's frequency-time resources, the UE assumes the data transmission is not mapped to the FTRS pattern's frequency-time resources (as for 230 in FIG. 2). The data transmission on the physical channel may either be mapped around the FTRS resources (in which case it is preferably rate matched), or rate matching is not adopted and the physical channel symbols mapped onto FTRS resources are punctured. The term "around" in this context means that, in a time-frequency plane, the physical channel resources scheduled to be used for the data transmission are adjacent the FTRS resources 240, 250 (e.g., on two or more sides or portions of sides thereof). However, "around" does not require the FTRS resource be surrounded by the physical channel resources scheduled to be used for the data transmission.

The UE uses the FTRS also to obtain more accurate timing for demodulation of the corresponding data transmission on the physical channel. However, if the UE already has adequate timing accuracy, it may not use the FTRS.

Figure 3:
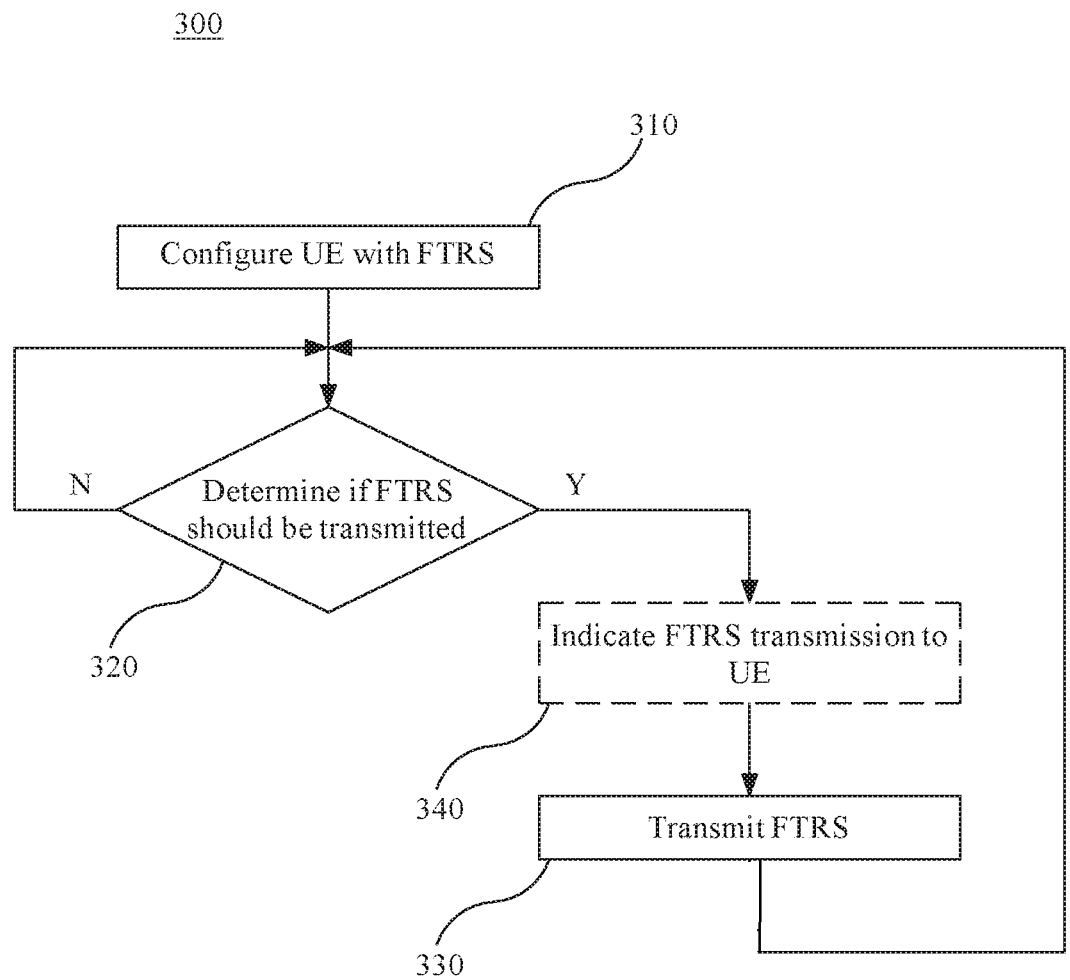
FIG. 3 is a flowchart of a method performed by a network node according to an embodiment.

FIG. 3 is a flowchart illustrating a method 300 performed by a base station according to an embodiment. Note that the "base station" term here is not intended to be limiting, rather indicating a network device (e.g., an access point, a network node, etc.) as opposed to a wireless device merely connected to the network. In a cloud environment, it should be understood that different functionalities may be implemented on different physical devices. For example, the FTRS configuration may be provided by an RRC node, the FTRS-related decisions may be formed on a base station and the actual transmission of the FTRS or transmission data may emerge from another distinct physical device.

At 310, the base station configures the UE with FTRS resources. At 320, the base station determines whether to transmit FTRS to the UE. If determined that FTRS should be transmitted (the Y branch of 320), the UE transmits FTRS according to the UE's configuration, at 330. Optionally, the base station indicates the FTRS transmission to the UE at 340.

Figure 4:
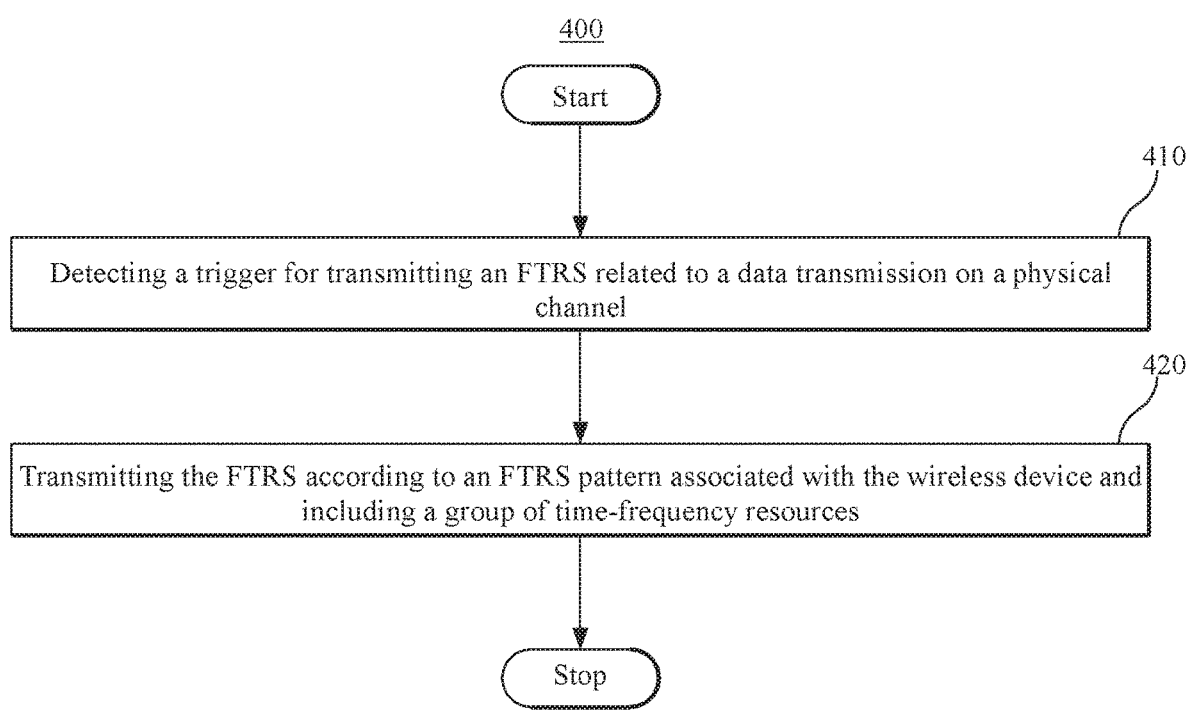
FIG. 4 is a diagram of a method for a network node according to another embodiment.

FIG. 4 is a diagram of a method 400 for a base station according to an embodiment. Method 400 includes detecting a trigger for transmitting a fine timing reference signal, FTRS, related to a data transmission on a physical channel, for a wireless device at 410. Method 400 further includes transmitting the FTRS according to an FTRS pattern associated with the wireless device and including a sequence of time-frequency resources at 420. In a variation of the embodiment shown in FIG. 4, the base station may just transmit the FTRS (according to the FTRS pattern) related to a data transmission on a physical channel, and transmit the data transmission (i.e. without an explicit trigged detection step).

The trigger for transmitting a fine timing reference signal is an action or situation that indicates the need or a highly likelihood of the need for the wireless device to be able to perform a fine synchronization. In different embodiments, one or more of the following potential triggers may be implemented. The trigger may be:
 the data transmission being an HOM or MIMO transmission,
 a predetermined time interval passed since FTRS has been transmitted to the wireless device,
 the Block Error Rate (BLER) related to the wireless device exceeding a predetermined BLER threshold,
 a timing accuracy (TA), of an uplink transmission from the wireless device is less than a predetermined TA threshold, and/or
 an FTRS request received from the wireless device.

As already discussed, receiving these FTRS enables the wireless device to perform fine synchronization. The data transmission may partially overlap the FTRS pattern (e.g., 110-150 and 210-250 overlapping 175 and 275 in FIGS. 1 and 2). As in FIG. 2, the FTRS may be transmitted on a first resource overlapping the scheduled data transmission on the physical channel. The data transmission may use the FTRS pattern's frequency-time resources not used for transmitting FTRS. In one embodiment, the data transmission of a physical channel may be punctured by the FTRS pattern's frequency-time resource used to transmit the FTRS. In another embodiment, the data transmission on the physical channel is mapped around (not necessarily surrounding) the periodic pattern's frequency-time resources. The data transmission on the physical channel may be rate-matched.

Figure 5:
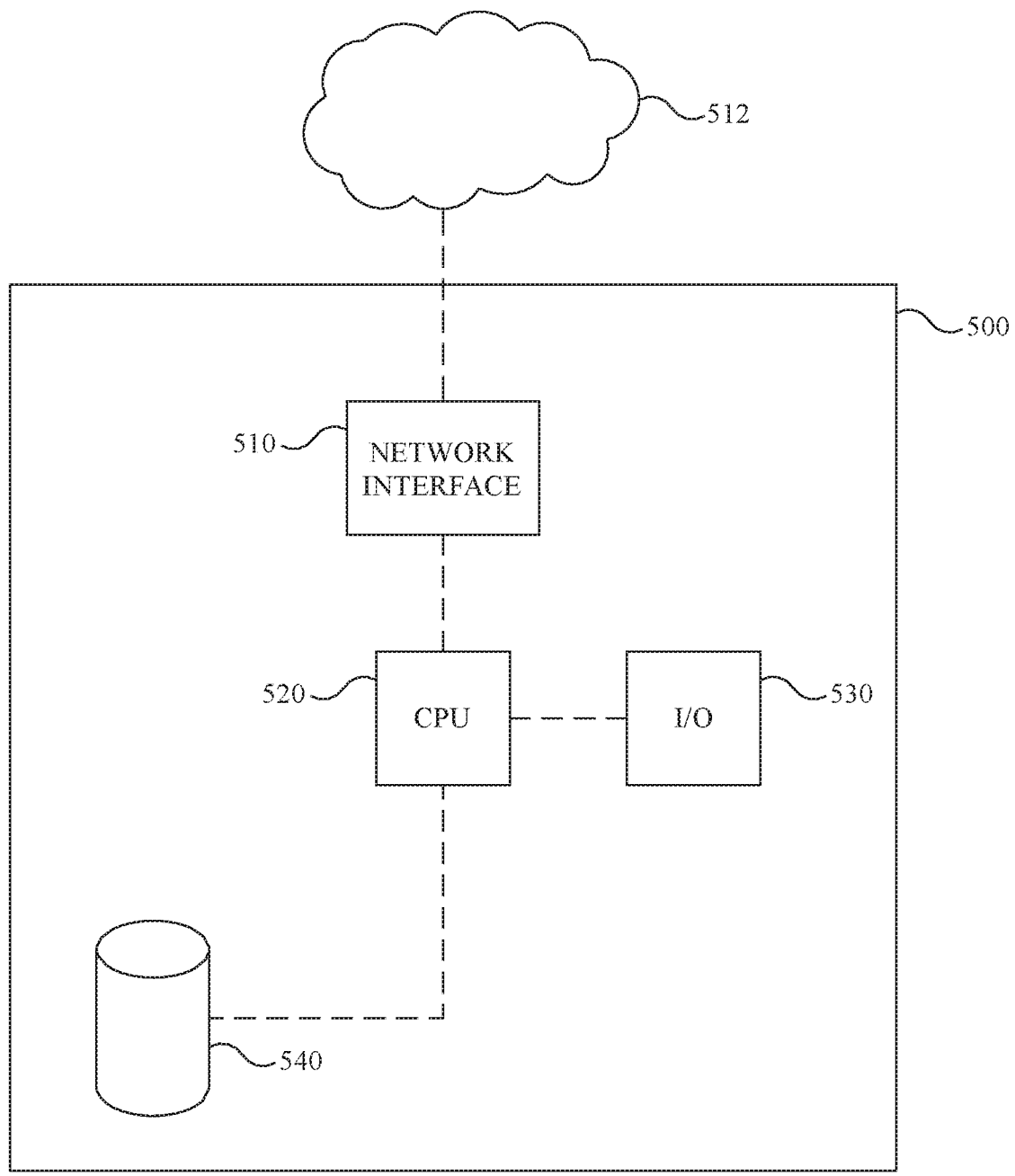
FIG. 5 is a block diagram of a network node configured to perform various methods according to an embodiment.

FIG. 5 is a schematic diagram of a base station able to perform methods 300 and 400 and all other embodiments described in this document. Base station 500 includes a network interface 510 configured to emit and receive signals to other devices in the communication network 512. Network interface 510 is connected to a processing unit 520 configured to control interface 510 to send FTRS signals to wireless devices, thereby enabling time synchronization thereof. Base station 500 may also include a memory 540 and a user interface 530. Memory 540 may store executable codes which, when executed by processing unit 520 make processing unit to perform methods according to various embodiments.

Figure 6:
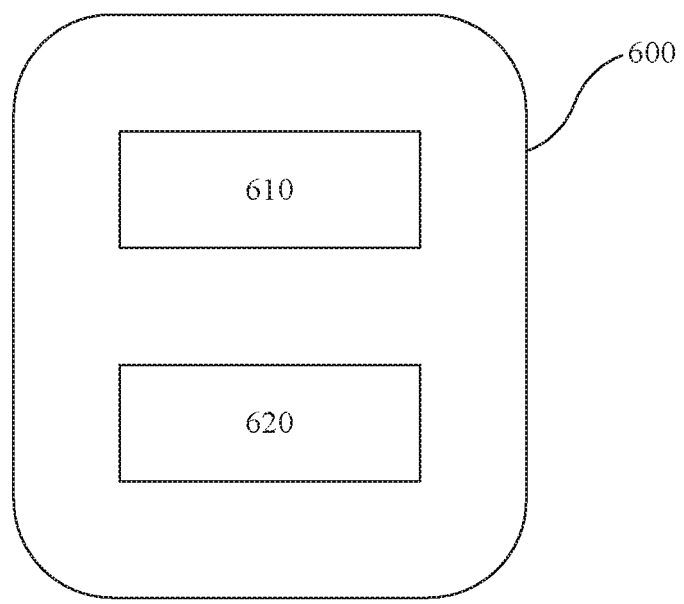
FIG. 6 is another diagram of a network node according to an embodiment.

FIG. 6 is another diagram of a network node 600 according to an embodiment. The network node includes hardware and/or software modules. A detecting module 610 is configured to detect a trigger for transmitting an FTRS related to a data transmission to a wireless device, on a physical channel. A transmission module 620 is configured to transmit the FTRS according to an FTRS pattern associated with the wireless device, the FTRS pattern including a group of time-frequency resources.

Figure 7:
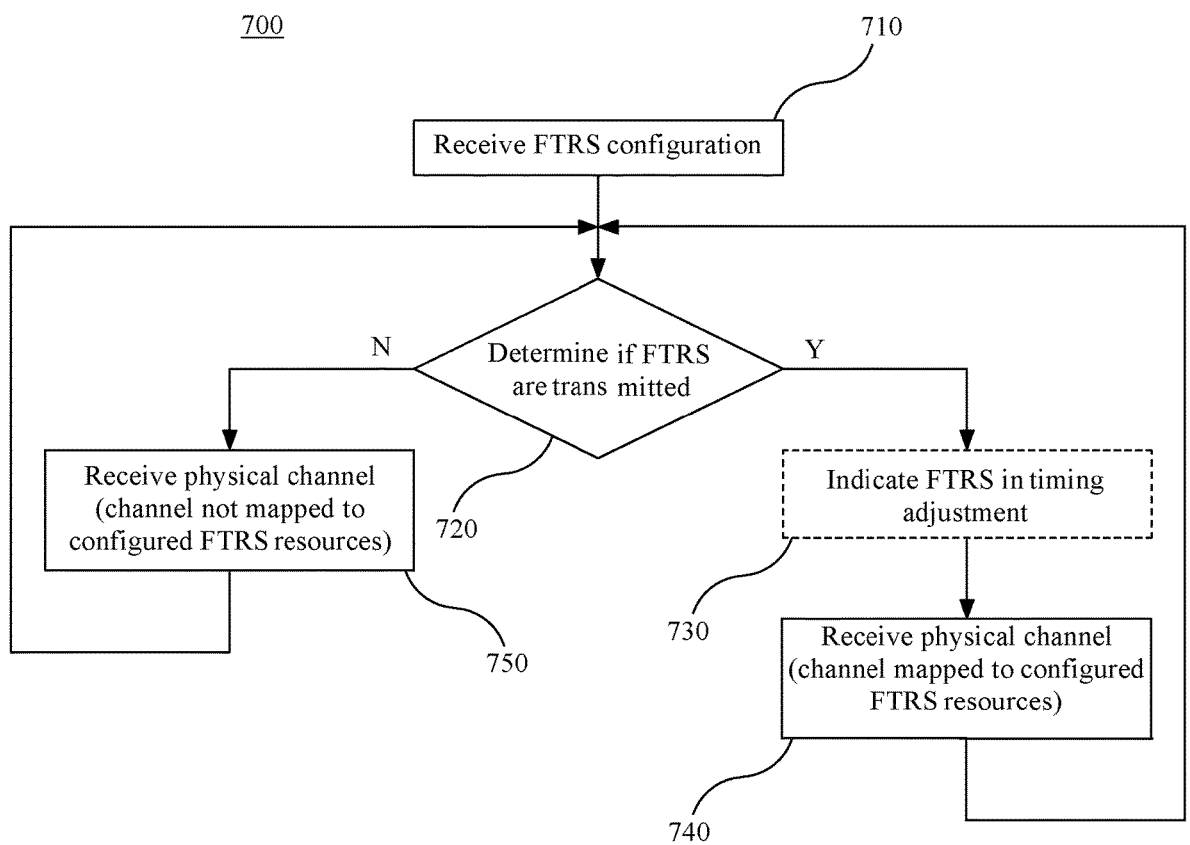
FIG. 7 is a flowchart of a method performed by a wireless device according to another embodiment.

FIG. 7 is a flowchart illustrating a method 700 performed by a wireless device according to an embodiment. At 710, the wireless device receives a FTRS pattern. At 720, the wireless device determines whether the FTRS are going to be transmitted according to the FTRS pattern. If determined that the FTRS have been received (the Y branch of 720), the wireless device uses the received FTRS for timing adjustment (if needed) at 730. Then, at 740, the wireless device receives the data transmission on the physical channel. However, at 750, the wireless device receives the data transmission on the physical channel without receiving FTRS (the N branch of 720).

Figure 8:
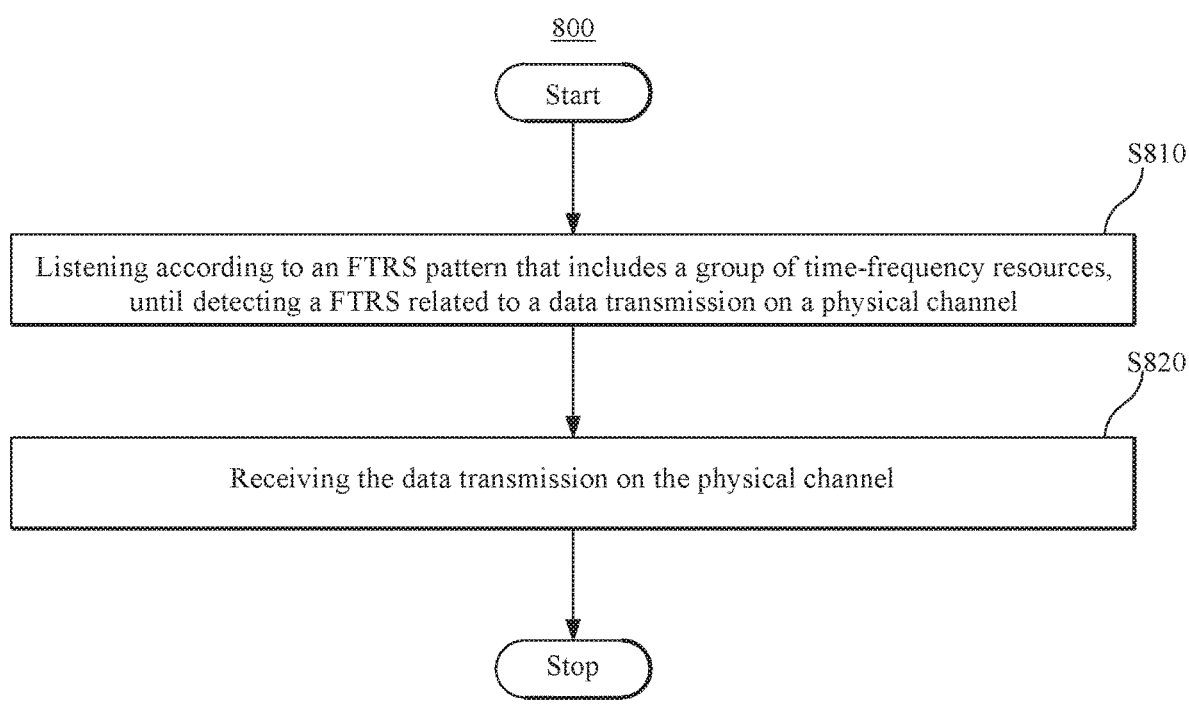
FIG. 8 is a diagram of a method for a wireless device according to another embodiment.

FIG. 8 is a flowchart of a method 800 for a wireless device connected to a communication network according to an embodiment. Method 800 includes listening according to an FTRS pattern that includes a sequence of time-frequency resources, until detecting a FTRS related to a data transmission on a physical channel at 810. Method 800 further includes receiving the data transmission on the physical channel at 820. Method 800 may further include optionally include performing a fine synchronization using the FTRS to decode data received during the data transmission.

As exemplarily illustrated in FIGS. 1 and 2, the data transmission as scheduled may partially overlap the FTRS pattern. As in FIG. 1, the FTRS may be detected on one of the frequency-time resources in the FTRS pattern, prior to the data transmission. Alternatively or additionally, as in FIG. 2, the FTRS may be detected on a first of the time-frequency resources in the FTRS overlapping the data transmission as scheduled. The data transmission may use some of the overlapping time-frequency resources in the FTRS pattern that are not used for transmitting the FTRS.

In some embodiments, the wireless device starts listening following an FTRS trigger. The FTRS trigger may be receiving an indication from the communication network. The FTRS trigger may be receiving data after longer than a predetermined time interval passed (and thus potentially the fine synchronization has been lost). Alternatively, the FTRS trigger is the wireless device submitting a request for FTRS upon receiving a data transmission. Alternatively or additionally, the FTRS trigger may be the data transmission, which is a HMO or a MIMO transmission, being scheduled.

In one embodiment, the data transmission received on the physical channel is punctured by one or more of the time-frequency resources in the FTRS pattern on which the FTRS is detected. In another embodiment, the data transmission received on the physical channel is mapped around one or more of the time-frequency resources in the FTRS pattern on which the FTRS is detected.

Method 800 may also include receiving FTRS configuration data for determining the FTRS pattern. The time-frequency resources in the FTRS pattern may include less than a bandwidth configurable for communication between the wireless device and the communication network. The time-frequency resources in the FTRS pattern may be at equal time intervals and/or may cover same frequencies.

Figure 9:
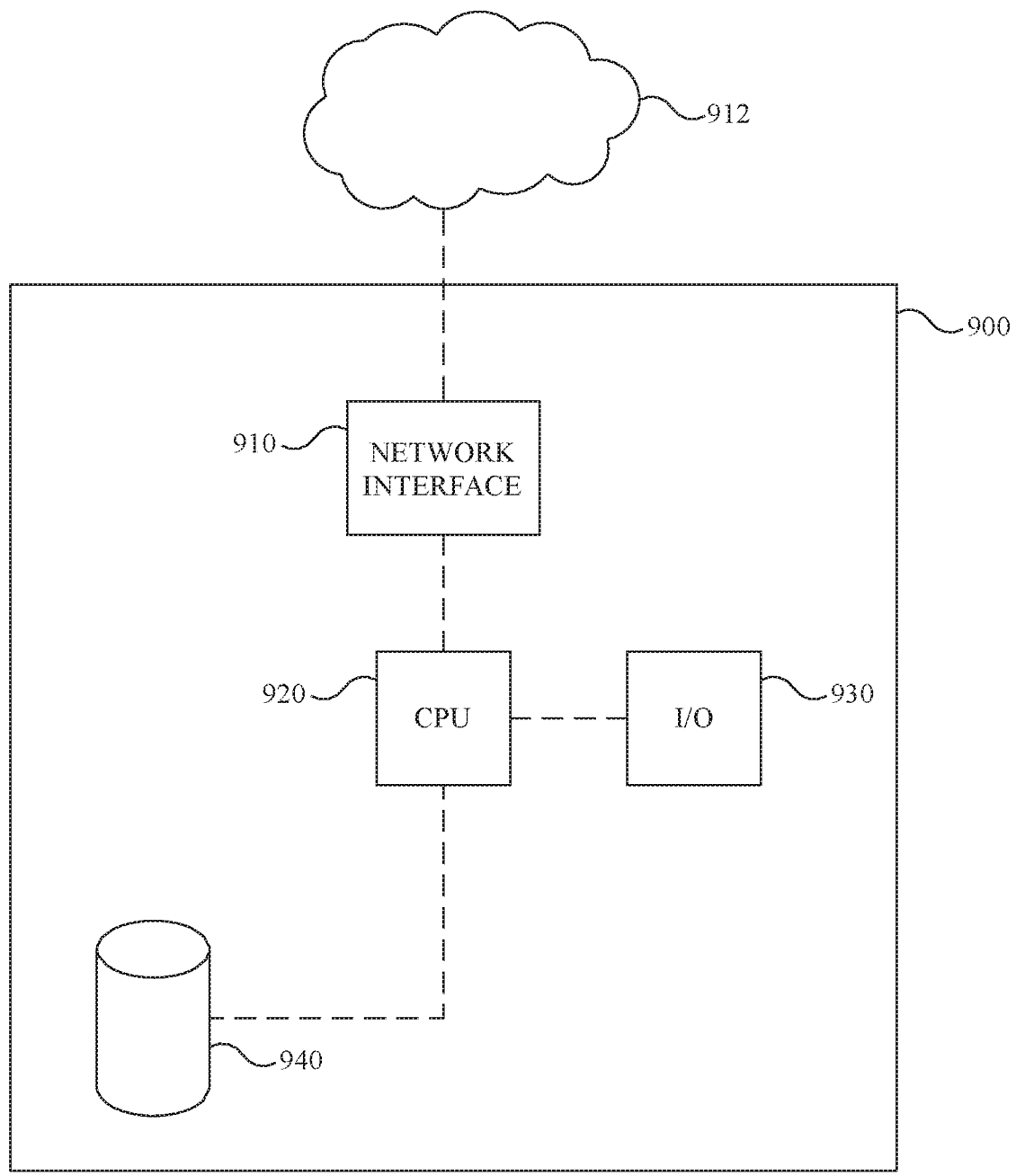
FIG. 9 is a block diagram of a wireless device configured to perform various methods according to an embodiment.

FIG. 9 is a schematic diagram of a wireless device able to perform methods 700 and 800 and all other embodiments described in this document. Wireless device 900 includes a network interface 910 configured to emit and receive signals to other devices in the communication network 912. Network interface 910 is connected to a processing unit 920 configured to control interface 910 to receive FTRS signals, thereby enabling time synchronization based on the received FTRS and/or data reception on the corresponding channel.

Wireless device 900 may also include a memory 940 and a user interface 930. Memory 940 may store executable codes which, when executed by processing unit 920 make the processing unit perform methods according to various embodiments.

Figure 10:
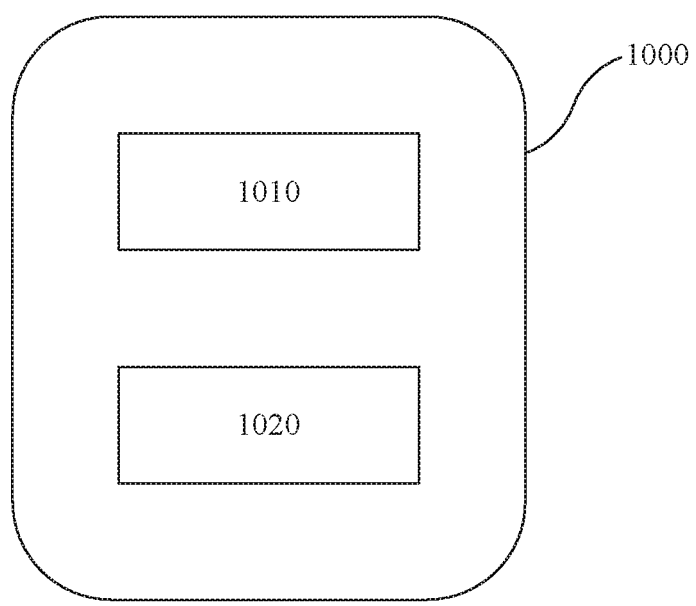
FIG. 10 is another diagram of a wireless device according to another embodiment.

FIG. 10 is another diagram of a wireless device 1000 including hardware and/or software modules according to an embodiment. A listening module 1010 is configured to listen, according to an FTRS pattern that includes a group of time-frequency resources, until detecting an FTRS related to a data transmission on a physical channel. A data receiving module 1020 is configured to receive the data transmission.

To summarize, according to several embodiments a wireless device connected to a network is configured to receive FTRS enabling accurate synchronization for a data transmission on a physical channel. The FTRS and the physical channel are quasi-co-located with respect to time and/or frequency. The time-frequency resources used to transmit the FTRS are pre-configured in an FTRS pattern. The wireless device uses the FTRS for decoding the data transmission on the physical channel. The FTRS may be emitted by the network using a beam defined for the wireless device. Presence of the FTRS may be indicated to the wireless device via an extra bit in a control channel. FTRS configuration may contain a time-frequency pattern of when and where (frequency-wise) to expect FTRS. The wireless device may determine the presence of FTRS blindly.

Transmitting the FTRS occasionally (on demand or when needed) leads to more energy-efficient network operation than conventional methods (e.g., when continuously transmitting the CRS). Moreover using less than the entire available bandwidth to transmit these fine synchronization signals leaves room (bandwidth) for additional signals and services.

It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method implemented in a wireless device, the method comprising:
    receiving, by the wireless device, an indication of physical channel resources; and
    detecting, by the wireless device, a reference signal quasi-co-located with the indicated physical channel resources.

2. The method of claim 1, further comprising performing, by the wireless device, a timing estimate for data transmission on the indicated physical channel resources.

3. The method of claim 2, wherein a demodulation of the physical channel resources overlaps the timing estimate.

4. The method of claim 1, further comprising performing, by the wireless device, channel measurements based on the received reference signal and following a reference signal trigger.

5. The method of claim 4, wherein the reference signal trigger is an indication received from a communication network.

6. The method of claim 1, further comprising receiving, by the wireless device, a reference signal configuration data for the reference signal.

7. The method of claim 1, wherein the reference signal corresponds to time and frequency resources which are less than a bandwidth configurable for communication between the wireless device and the communication network.

8. The method of claim 1, wherein the reference signal corresponds to one or more time-frequency resources in a reference signal pattern which are at equal time intervals and/or cover same frequencies.

9. The method of claim 1, further comprising performing, by the wireless device, a fine synchronization using the reference signal to decode data received during data transmission.

10. A wireless device comprising processing circuitry operable to:
   receive, by the wireless device, an indication of physical channel resources; and
   detect, by the wireless device, a reference signal quasi-co-located with the indicated physical channel resources.

11. The method of claim 1, wherein the reference signal and the indicated physical channel resources are quasi-co-located in time and/or frequency.

* * * * *